(12) United States Patent
Gomo et al.

(10) Patent No.: US 7,258,128 B2
(45) Date of Patent: Aug. 21, 2007

(54) POST YARD HYDRANT WITH CONTROLLED ADJUSTABLE FLOW

(75) Inventors: David Michael Gomo, Waterford, PA (US); Doug Wroblewski, Wattsburg, PA (US)

(73) Assignee: Zurn Industries, Inc., Erie, PA (US)

( * ) Notice: Subject to any disclaimer, the term of this patent is extended or adjusted under 35 U.S.C. 154(b) by 136 days.

(21) Appl. No.: 11/331,828

(22) Filed: Jan. 13, 2006

(65) Prior Publication Data
US 2007/0163653 A1    Jul. 19, 2007

(51) Int. Cl.
*F16K 1/52* (2006.01)
*F16K 31/60* (2006.01)

(52) U.S. Cl. .................. 137/15.08; 137/292; 251/285

(58) Field of Classification Search .......... 137/292, 137/291, 272, 15.08; 251/285
See application file for complete search history.

(56) References Cited

U.S. PATENT DOCUMENTS

| | | | |
|---|---|---|---|
| 235,790 A | 12/1880 | Luse | |
| 1,881,367 A * | 10/1932 | McKesson | 251/285 |
| 1,886,022 A * | 11/1932 | Hutton | 222/309 |
| 2,649,111 A | 8/1953 | Anderson | |
| 2,730,326 A | 1/1956 | Staben | |
| 2,736,212 A | 2/1956 | Spence | |
| 3,043,556 A | 7/1962 | Noland | |
| 3,070,116 A | 12/1962 | Noland et al. | |
| 3,158,170 A | 11/1964 | Tubbs | |
| 3,285,273 A | 11/1966 | Noland | |
| 3,504,694 A | 4/1970 | Noland | |
| 3,523,549 A | 8/1970 | Anderson | |
| 3,581,761 A | 6/1971 | Noland | |
| 3,632,082 A | 1/1972 | Noland | |
| 3,813,080 A * | 5/1974 | Rogers | 251/285 |
| 3,858,599 A | 1/1975 | Carlson | |
| 3,885,585 A | 5/1975 | Carpentier | |
| 3,943,963 A | 3/1976 | Papacek | |
| 3,986,700 A | 10/1976 | Carpentier | |
| 4,112,966 A | 9/1978 | Carlson | |
| 4,372,339 A | 2/1983 | Anderson | |
| 4,653,521 A | 3/1987 | Fillman | |
| 4,653,522 A | 3/1987 | Fillman et al. | |
| 5,289,840 A | 3/1994 | Anderson | |
| 5,701,925 A | 12/1997 | Mulligan et al. | |
| 6,047,723 A | 4/2000 | Hoeptner, III | |
| 6,135,359 A | 10/2000 | Almasy et al. | |
| 6,178,988 B1 | 1/2001 | Royle | |
| 6,427,716 B1 | 8/2002 | Hoeptner, III | |
| 6,899,120 B1 | 5/2005 | Motley | |

* cited by examiner

*Primary Examiner*—Kevin Lee
(74) *Attorney, Agent, or Firm*—The Webb Law Firm

(57) ABSTRACT

The present invention is a post yard hydrant with controlled adjustable flow. The post yard hydrant includes a valve housing located below ground level for connection to a water supply under pressure, a head portion with an integral discharge nozzle positioned above ground level, and a casing portion with a first end connected to the head portion and a second end connected to the valve housing. The post yard hydrant further includes an operating rod disposed in the casing portion for reciprocation therein and an operating means configured to interact through a flow control linkage to reciprocate the operating rod. The flow control linkage is adapted to adjust water flow from a trickle level to a full pressure level.

25 Claims, 8 Drawing Sheets

POST YARD HYDRANT WITH CONTROLLED ADJUSTABLE FLOW

BACKGROUND OF THE INVENTION

1. Field of the Invention

The present invention relates, in general, to hydrants and, more particularly, to in-ground yard or post hydrants.

2. Description of Related Art

Yard hydrants are installed in water systems to provide water sources remote from buildings. Typical yard hydrants have a main water supply valve, a dry pipe, a wet pipe and an activation handle. The dry pipe is secured to the main valve housing where the water line is connected below the frost line. The dry pipe then extends up through the ground to a comfortable operating position above ground level. The wet pipe is positioned within the dry pipe and its lower end activates the main valve to turn off and on the water supply. The handle is mounted to the top end of the dry pipe and is linked to the upper end of the wet pipe to raise and lower the wet pipe and thereby control the valve from above ground. The upper end of the wet pipe has a spigot which can connect to a hose or spray out the water directly. To turn off the hydrant, an operator moves the handle to move the wet pipe and close the valve. Any water in the wet pipe will drain out of the hydrant below the frost line and thereby prevent water from freezing within the hydrant. The Zurn Z1395 yard hydrant is such a hydrant design.

FIG. 1 illustrates the Zurn Z1395 prior art yard hydrant 1. Yard hydrant 1 includes a head section 3 with a discharge nozzle 5 and a water channel 7, a casing 9 and a valve housing 11 adapted for connection to a source of water supply under pressure from a pipe in a traditional relationship. A drain hole 13 is provided in valve housing 11, as is well known. Head section 3, casing 9 and valve housing 11 are typically assembled by threadable attachments to each other, with head section 3 positioned above ground level at a first end of casing 9, and valve housing 11 positioned below ground level at a second end of casing 9.

Head section 3 further includes an integral upper body portion 15 provided with an opening 17. An operating rod 19, with a plunger assembly 21 on its lower end, is disposed in casing 9, with its upper end extending upwardly through opening 17. A packing nut 23, in an embracing relationship with operating rod 19, is threadably secured in opening 17 to provide a watertight closure for opening 17. Operating rod 19 is adapted to be reciprocated in casing 9 to provide water flow control. A handle 25 is provided for effecting such reciprocation for operating rod 19. Head section 3 further includes an integral head section post 27, with a pair of horizontally spaced ears 29 and 29' disposed in a spaced relationship above integral body portion 15. A linkage 31 includes a first end operably connected to the top of operating rod 19 and a second end extending between ears 29 and 29'. The top of handle 25 is secured to the second end of linkage 31 by a bolt 33 through holes 35 in ears 29 and 29'. By this arrangement, handle 25 can reciprocate operating rod 19 in a well-known manner. Yard hydrant 1 may optionally include a casing guard 37.

Currently, the yard hydrants of the type illustrated in FIG. 1 do not include an arrangement for controlling the flow of water from the hydrant. The above-described hydrants are only operable at full flow. Furthermore, while yard hydrants have been designed to allow for controlled adjustable flow, such yard hydrants are complex and difficult to manufacture.

Accordingly, a need exists for a yard hydrant that allows flow to be controlled from trickle flow to full pressure flow without substantially altering current yard hydrant designs. A further need exists for a kit that can be retrofitted to existing yard hydrants to provide controlled adjustable flow.

SUMMARY OF THE INVENTION

The hydrant includes a valve housing defining a longitudinally extending conduit having an upstream end and a downstream end, a nozzle in fluid communication with the upstream end, an operating rod disposed in the conduit for longitudinal reciprocation therein, a handle pivotally coupled to the valve housing and coupled to the driving end of the operating rod, and an adjustable stop coacting with the handle. The operating rod includes a plunger end and a driving end. The plunger end is disposed within the conduit and adapted to prevent flow of fluid through the conduit from the upstream end to the downstream end in a first position and permit flow through the conduit in a second position. A flow rate of fluid through the conduit is dependent based upon a longitudinal position of the plunger relative to the conduit. The pivotal movement of the handle relative to the valve body causes the operating rod to move in a longitudinal direction relative to the conduit. The adjustable stop limits the pivotal rotation of the handle and, in turn, limits the longitudinal movement of the operating rod, thereby limiting the second position of the operating rod.

The adjustable stop may be a linkage operatively coupling the handle to the operating rod. The valve housing may include a head portion with a pair of horizontally spaced ears. The horizontally spaced ears include holes adapted to receive the adjustable stop and the handle therebetween. The adjustable stop may include a first slot link and a second slot link, each slot link comprising a first end, a second end and a middle portion, the first end adapted to interact with the operating rod, the middle portion including a hole adapted to register with the holes of the ears of the head section, and the second end including an elongated slot for receiving an adjustment arrangement therethrough. The adjustment arrangement may include a spacer positioned between the elongated slot of the first slot link and the elongated slot of the second slot link, and a carriage bolt and wing nut adapted to secure the spacer therein.

Alternatively, the adjustable stop includes a first slot link and a second slot link, each slot link comprising a first end, a second end and a middle portion, the first end adapted to interact with the operating rod, the middle portion including a hole adapted to register with the holes of the ears of the head section, and the second end including a plurality of holes for receiving an adjustment arrangement therethrough. The adjustment arrangement may comprise a detent ring pin, and each of the plurality of holes indicates a specific flow rate.

The present invention is also a method of operating the post yard hydrant with controlled adjustable flow described above. The method includes the steps of adjusting the adjustable stop to a desired position, pivotally rotating the handle relative to the valve body until the handle comes into contact with the adjustable stop, thereby causing the operating rod to move in a longitudinal direction relative to the conduit. The adjustable stop limits the pivotal rotation of the handle and, in turn, limits the longitudinal movement of the operating rod, thereby limiting the second position of the operating rod.

The present invention is further directed to a modification kit for the post yard hydrant with controlled adjustable flow described above. The modification kit includes a first slot link and a second slot link. Each slot link includes a first end, a middle portion and a second end. The first end is adapted to be operatively coupled to the operating rod. The middle portion includes a hole adapted to register with holes of ears of a head section of the valve housing. The second end includes at least one opening. The modification kit further includes an adjustment arrangement adapted to be positioned through the at least one opening in the second end of the first slot link and the second slot link. The at least one opening may be an elongated slot, and the adjustment arrangement may include a spacer positioned between the elongated slot of the first slot link and the elongated slot of the second slot link, and a carriage bolt and wing nut adapted to secure the spacer therein. Alternatively, the at least one opening may be a plurality of holes, and the adjustment arrangement may be a detent ring pin.

These and other features and characteristics of the present invention, as well as the methods of operation and functions of the related elements of structures, and the combination of parts and economies of manufacture will become more apparent upon consideration of the following description and the appended claims, with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
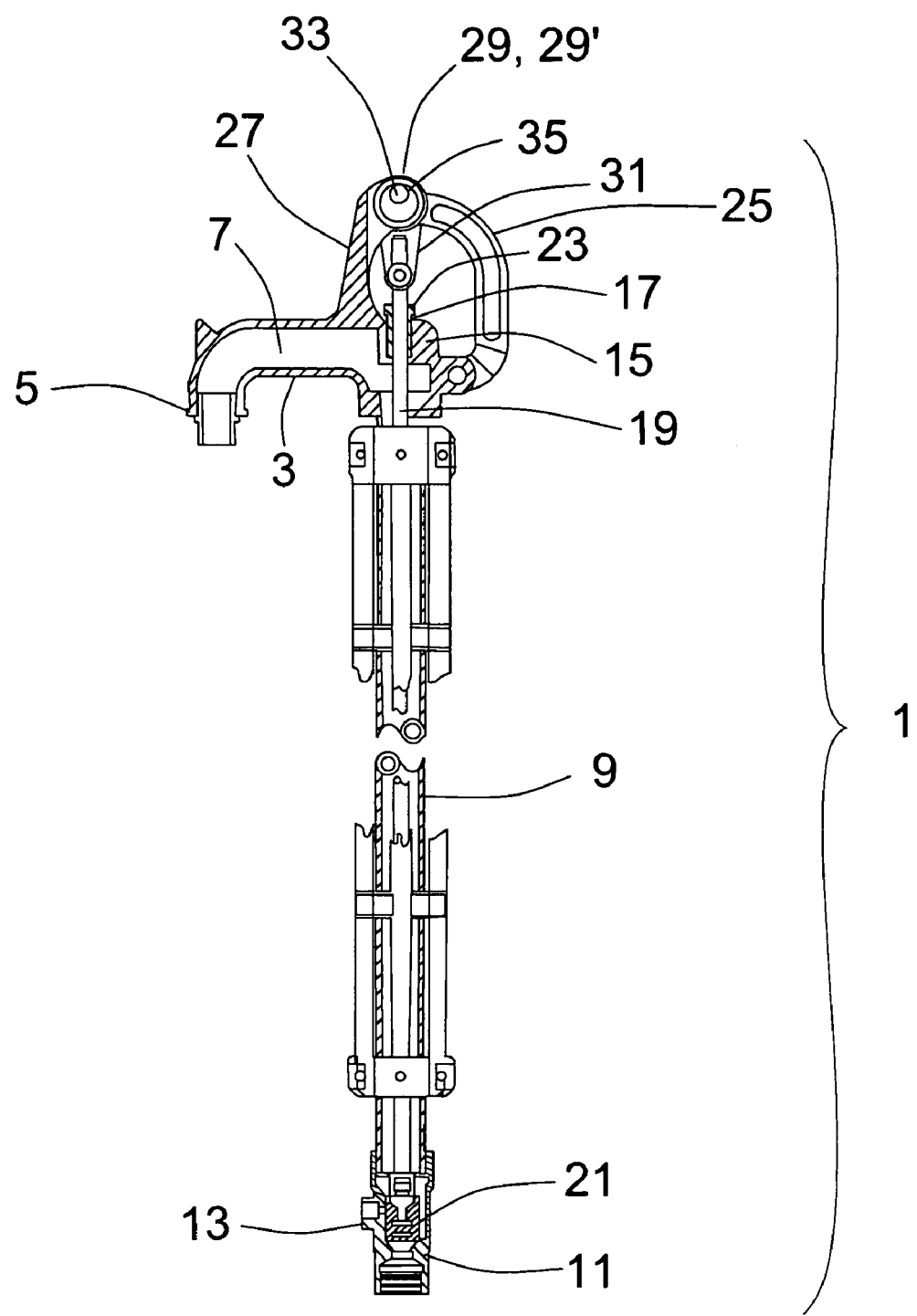
FIG. 1 is a vertical sectional view of a prior art yard hydrant.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings and described in the following specification are simply exemplary embodiments of the invention. Hence, specific dimensions and other physical characteristics related to the embodiments disclosed herein are not to be considered as limiting.

Figure 2:
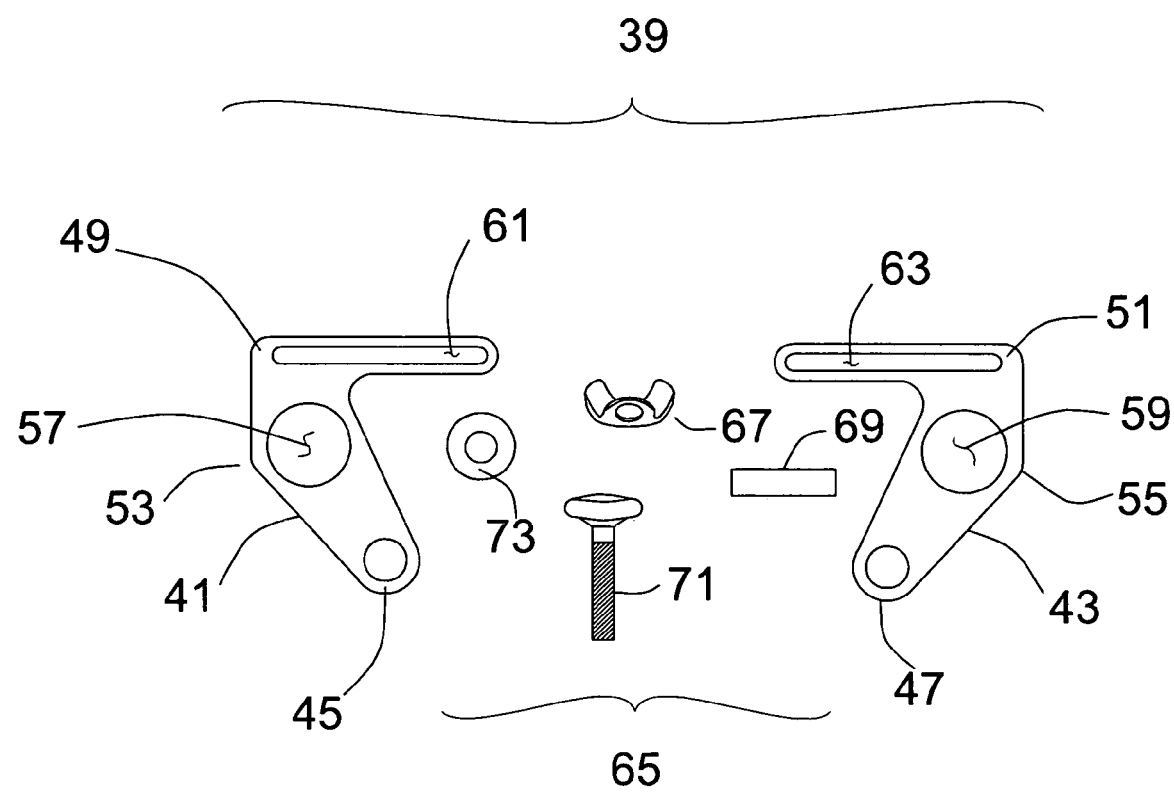
FIG. 2 is a top plan view of the elements of a slotted flow control linkage in accordance with the present invention.

With reference to FIG. 2, the present invention is directed to a conventional post yard hydrant 1 as described above with reference to FIG. 1 with a novel slotted flow control linkage 39 designed to replace linkage 31. Slotted flow control linkage 39 can be added to post yard hydrant 1 during manufacture of the hydrant or it may be easily retrofitted to preexisting post yard hydrants and is designed to provide the hydrant with the ability of an adjustable range of flow. Slotted flow control linkage 39 may be constructed from zinc-plated copper steel or any other suitable material. Slotted flow control linkage 39 includes a first slot link 41 and a second slot link 43. First slot link 41 is designed to be a mirror image of second slot link 43. Each slot link includes a first end 45 and 47, a second end 49 and 51, and a middle portion 53 and 55. Each first end 49 and 51 is operably connected to the top of operating rod 19. Each middle portion 53 and 55 includes a hole 57 and 59 adapted to register with holes 35 of ears 29 and 29' of head section post 27 shown in FIG. 1. Each second end 49 and 51 includes an elongated slot 61 and 63 for receiving an adjustment arrangement 65 therethrough. The adjustment arrangement 65 includes a wing nut 67, a spacer 69, a carriage bolt 71 and washer 73. While the adjustment arrangement 65 has been described as including wing nut 67, spacer 69, carriage bolt 71 and washer 73, this is not to be construed as limiting the present invention since it has been envisioned that any suitable adjustment arrangement can be utilized. The yard hydrant of the present invention may be assembled to include flow control linkage 39 or flow control linkage 39 may be separately available as a modification kit for prior art hydrants.

With reference to FIGS. 3A–3D, and with continuing reference to FIGS. 1 and 2, slotted flow control linkage 39 is installed in a conventional post yard hydrant 1 through the following steps. First, first ends 45 and 47 of slot links 41 and 43 are secured to the top of operating rod 19 through the use of a bolt 75 and nut 77, or any other suitable arrangement for securing. Next, handle 25 is placed between middle portions 53 and 55 of slot links 41 and 43. The holes 57 and 59 shown in FIG. 2 of middle portions 53 and 55 are then registered with holes 35 of ears 29 and 29' of head section post 27. A bolt 33 along with a locknut 79 or other suitable securing means is then used to secure slot links 41 and 43 and handle 25 to head section post 27. Next, the adjustment arrangement 65 is assembled by inserting spacer 69 between slot link 41 and slot link 43 so as to align with elongated slots 61 and 63. Carriage bolt 71 is then inserted through elongated slot 61, spacer 69 and elongated slot 63. Carriage bolt 71 is finally secured with washer 73 and wing nut 67.

The purpose of slotted flow control linkage 39 is to allow a user to adjust the flow of a yard hydrant from trickle flow to full pressure flow. In order to adjust flow, the user simply loosens wing nut 67 enough to slide spacer 69 to the desired stopping position and then retightens wing nut 67. If the user desires trickle flow (i.e., from about 0.75–1.00 gal/min), spacer 69 is positioned as designated by reference letter B as closely along elongated slots 61 and 63 to handle 25 as possible as shown in phantom in FIG. 3A. On the other hand, if the user desires full pressure flow (i.e., 17.0–18.0 gal/min), spacer 69 is positioned as closely along elongated slots 61 and 63 to discharge nozzle 5 as possible as shown in phantom designated by reference letter A in FIG. 3A. An infinite number of other flow rates are possible by sliding spacer 69 along elongated slots 61 and 63 between the two above-described positions to achieve the desired flow rate.

An advantage of such a flow control system is that wing nut 67 can be loosened, spacer 69 can be adjusted and wing nut 67 can be retightened all by hand. Therefore, no tools are required to adjust the flow rate of post yard hydrant 1.

Figure 3A:
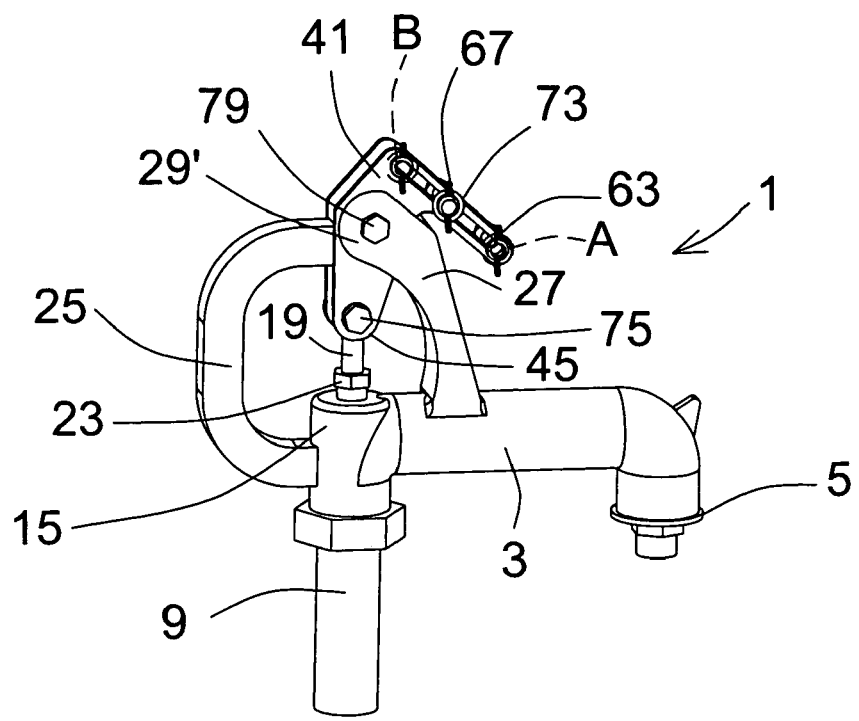
FIGS. 3A–3D are a left side view, a right side view, a front view and a rear view, respectively, of a post yard hydrant including a slotted flow control linkage in accordance with the present invention.
Figure 3B:
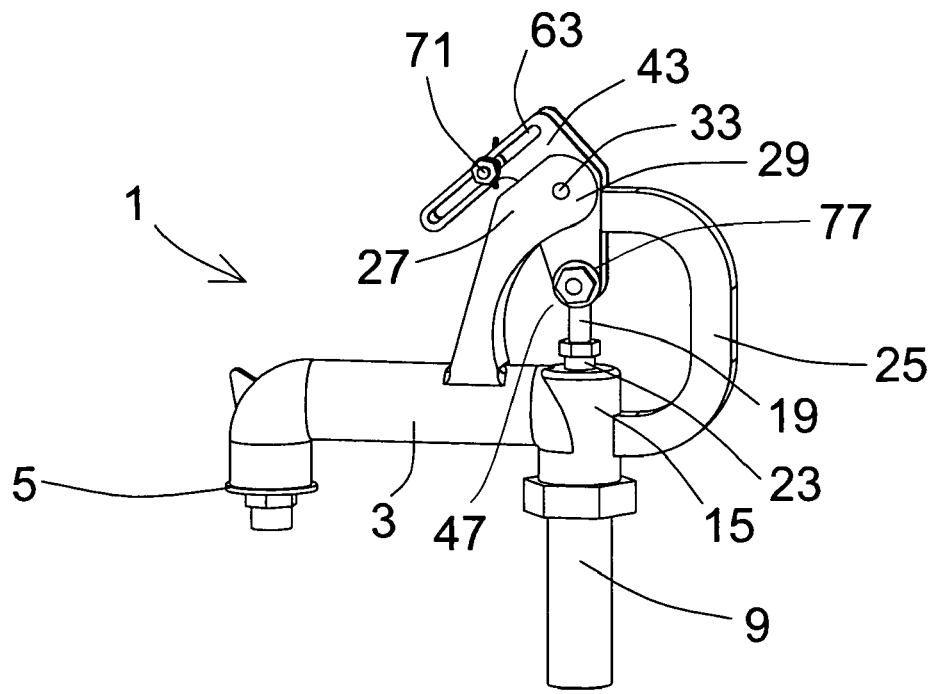
Figure 3C:
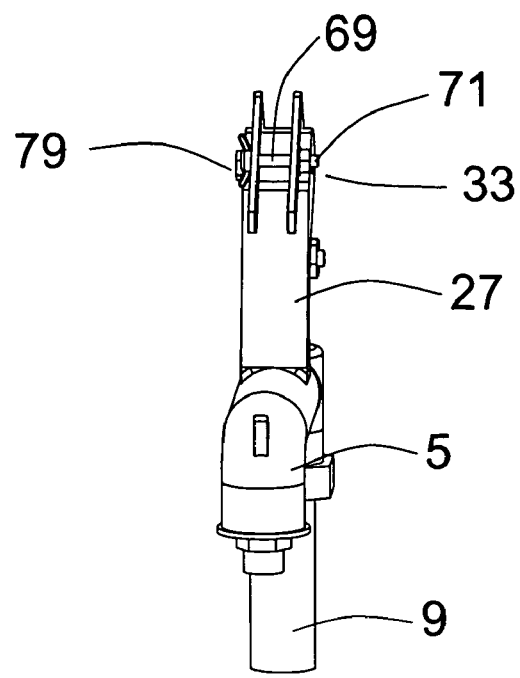
Figure 3D:
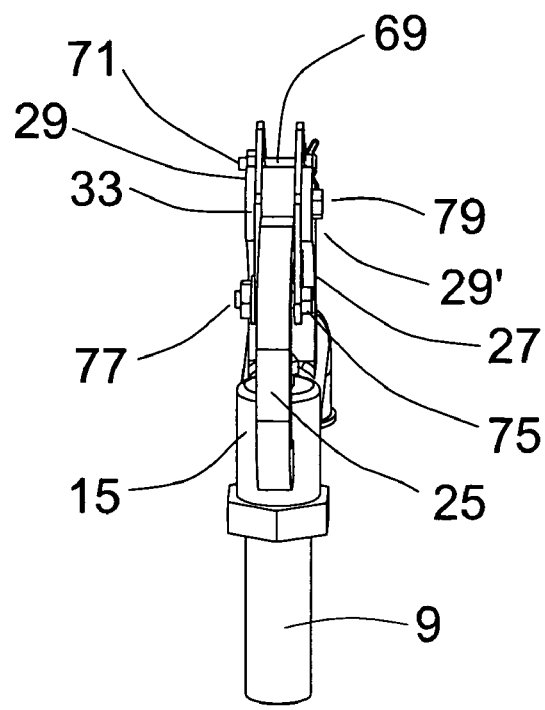
Figure 3E:
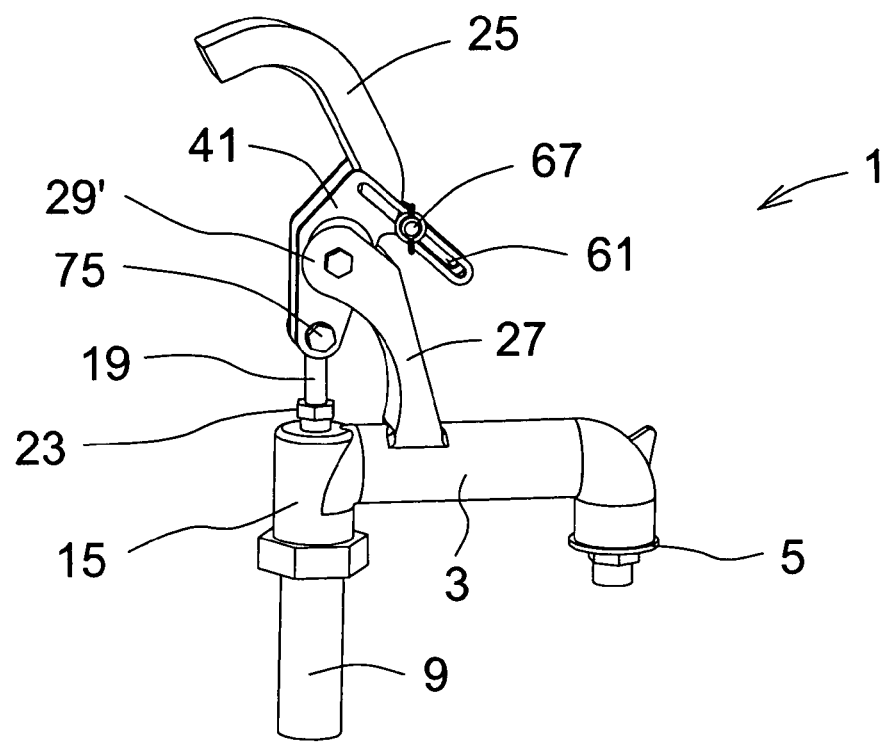
FIGS. 3E and 3F are a left side view and a right side view, respectively, of the post yard hydrant of FIGS. 3A and 3B, with a handle in an open position in accordance with the present invention.
Figure 3F:
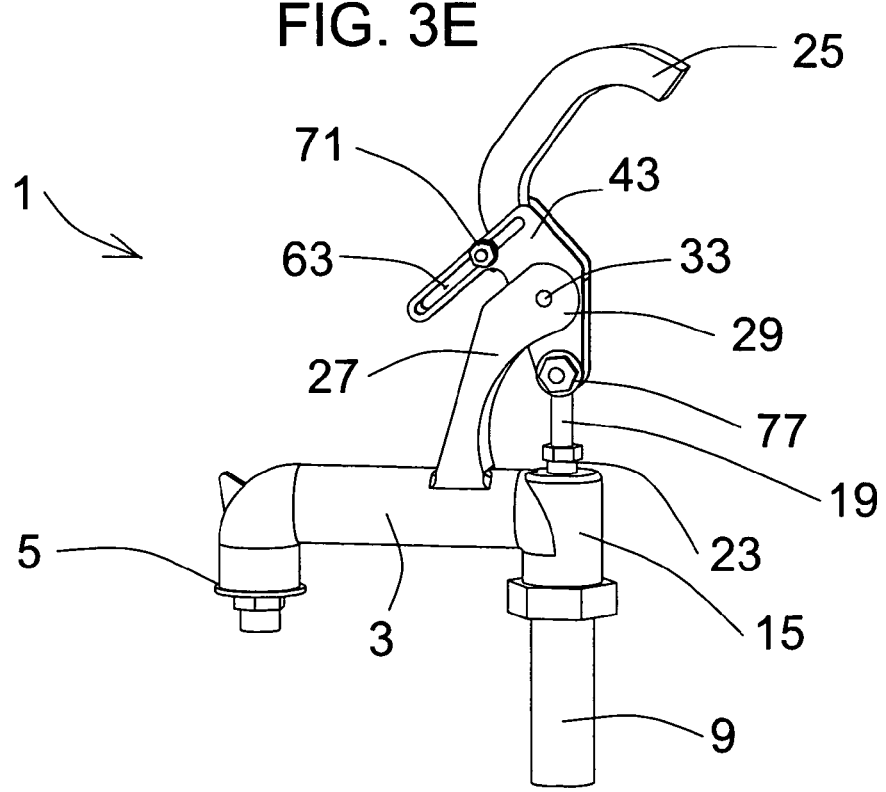

With reference to FIGS. 3E and 3F and with continuing reference to FIGS. 3A–3D, after the user has set the position of spacer 69 as described above, handle 25 is pivotally rotated, thereby displacing operating rod 19 and allowing fluid to flow through casing 9 and out discharge nozzle 5. Handle 25 moves relative to operating rod 19, links 41 and 43 and spacer 69. However, in operation, links 41 and 43 and spacer 69 do not move relative to each other. The rotation of handle 25 is limited by the position of spacer 69. If spacer 69 is in position B, handle 25 will only be able to rotate a short distance before being stopped, thereby limiting the displacement of operating rod 19. Therefore, hydrant 1 will only provide a trickle flow. Alternatively, if spacer 69 is in position A, handle 25 will be able to be rotated a maximum distance before being stopped, thereby allowing a large displacement of operating rod 19. In this instance, hydrant 1 will provide water at a maximum flow rate.

Figure 4:
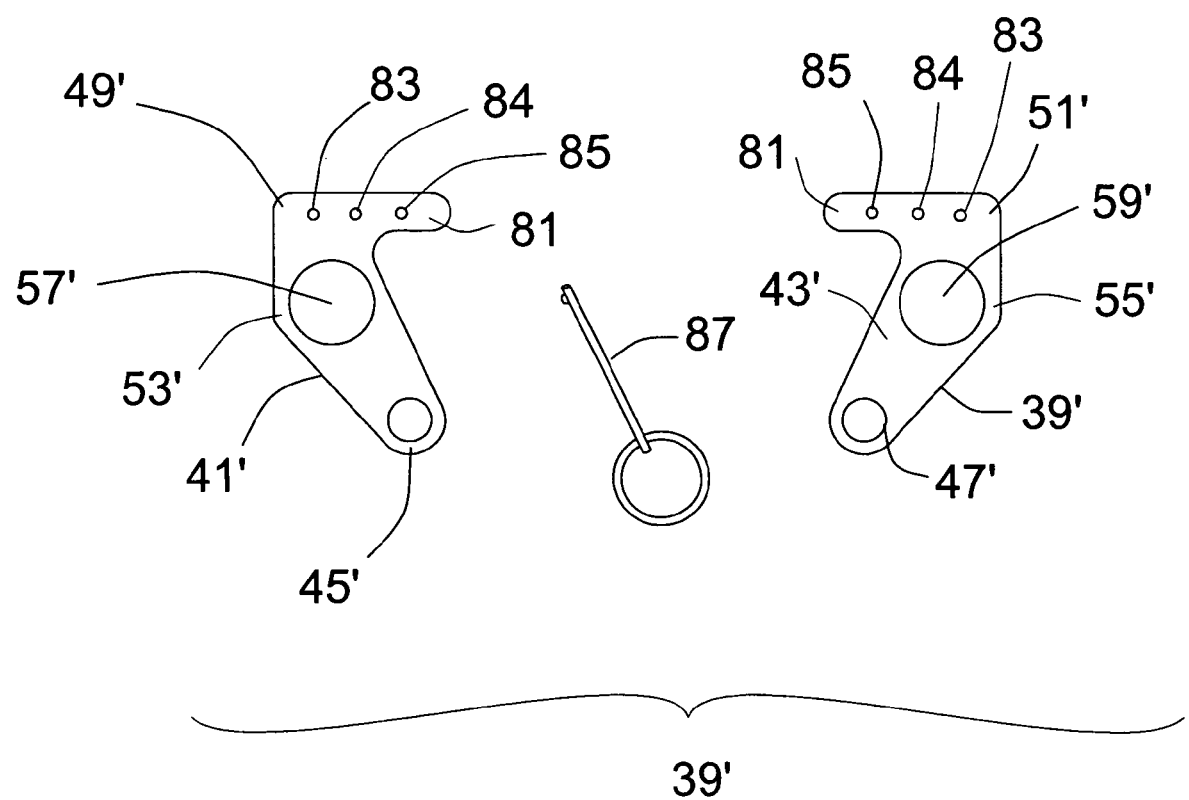
FIG. 4 is a top plan view of the elements of an alternate embodiment of a flow control linkage in accordance with the present invention.

With reference to FIG. 4, an alternate embodiment of the flow control linkage 39' includes a first slot link 41' and a second slot link 43'. First slot link 41' is designed to be a mirror image of second slot link 43'. Each slot link includes a first end 45' and 47', a second end 49' and 51', and a middle portion 53' and 55'. Each first end 49' and 51' is operably connected to the top of operating rod 19. Each middle portion 53' and 55' includes a hole 57' and 59' adapted to register with holes 35 of ears 29 and 29' of head section post 27. Each second end 49' and 51' includes flange 81, with a plurality of positioning holes 83, 84 and 85 formed therein. Positioning holes 83, 84 and 85 are adapted for receiving an adjustment arrangement therethrough and are strategically located for a predetermined flow rate. For instance, FIG. 4 illustrates that each slot link 41' and 43' includes three positioning holes 83, 84 and 85 indicating low, medium and full flow, respectively. A detent ring pin 87 is positioned through holes 83, 84 and 85 to act as an adjustment arrangement. Like the embodiment shown in FIGS. 3A–3F, handle 25 moves relative to operating rod 19, links 41' and 43' and detent ring pin 87. However, in operation, links 41' and 43' and detent ring pin 87 do not move relative to each other.

Figure 5A:
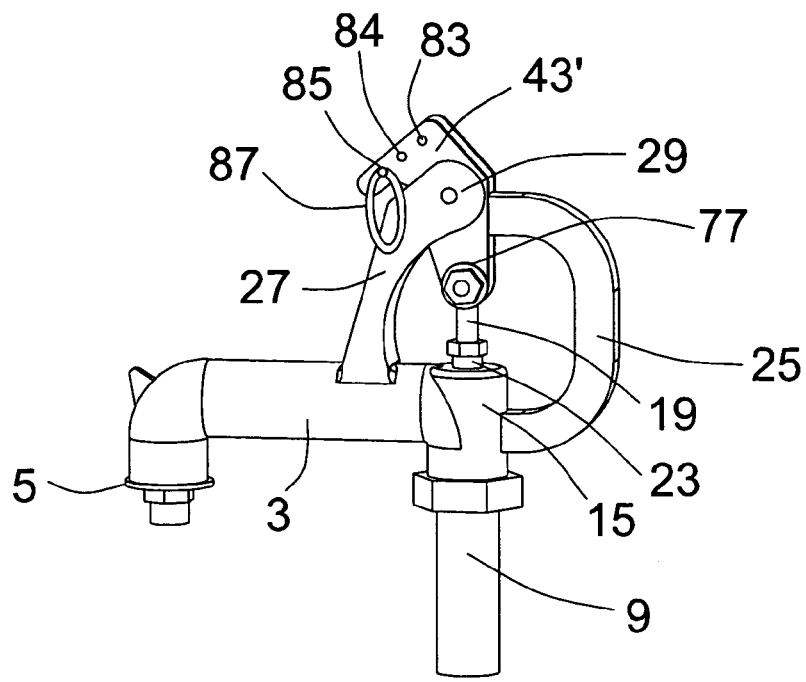
FIGS. 5A and 5B, are a right side view and a rear view, respectively, of a post yard hydrant including the alternate embodiment of the flow control linkage in accordance with the present invention.
Figure 5B:
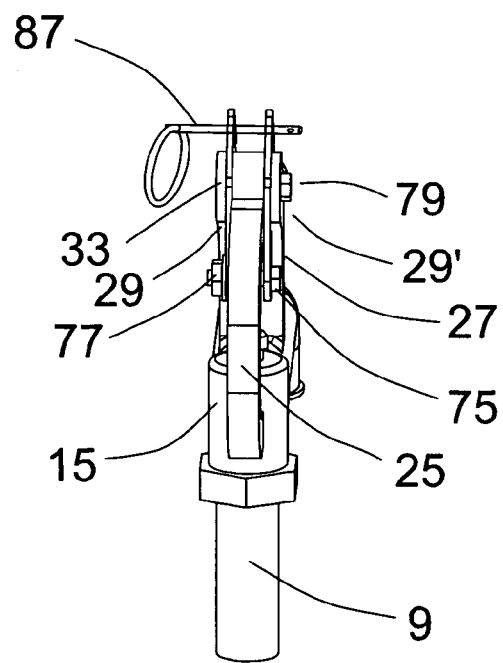

With reference to FIGS. 5A and 5B, and with continuing reference to FIGS. 1 and 4, flow control linkage 39' is installed in hydrant 1 in the same manner as described above with reference to flow control linkage 39. Once flow control linkage 39' is installed, a user can control flow by adjusting the position of detent ring pin 87. If the user desires low flow, detent ring pin 85 is positioned in positioning holes 83, which are located nearest to handle 25. On the other hand, if the user desires full flow, detent ring pin 87 is positioned in positioning holes 85, which are located nearest to discharge nozzle 5 as possible. Finally, medium flow is achieved by positioning detent ring pin 87 in the center positioning holes 84. Flow control linkage 39' provides for a set number of flow rates, whereas flow control linkage 39 offers an infinite variety of flow rates.

Figure 5C:
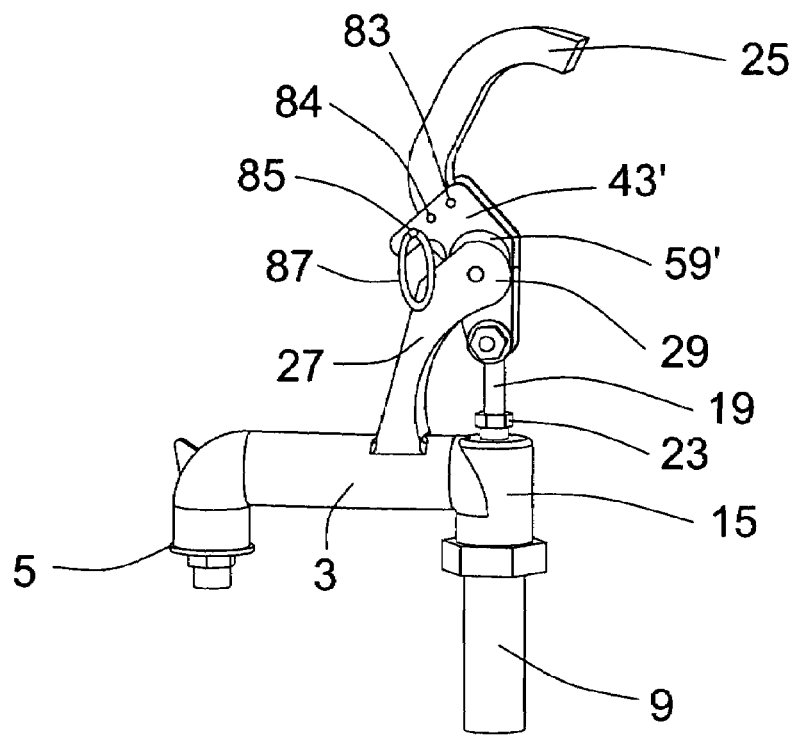
FIGS. 5C and 5D are a right side view and a rear view, respectively, of the post yard hydrant of FIGS. 5A and 5B with a handle in an open position in accordance with the present invention.
Figure 5D:
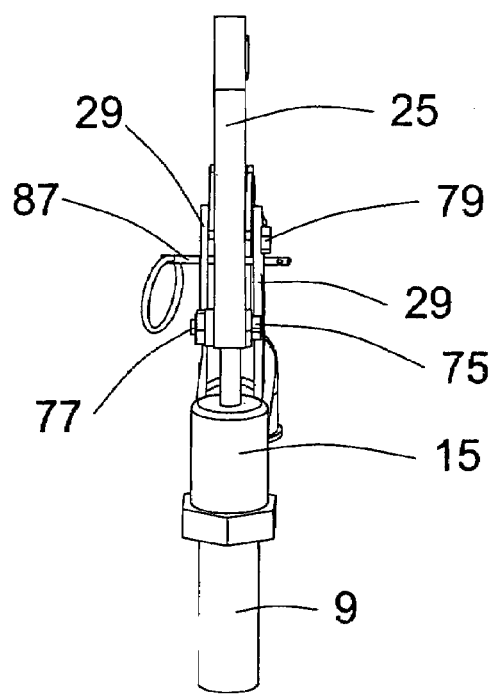

With reference to FIGS. 5C and 5D and with continuing reference to FIGS. 5A and 5B, after the user has set the position of detent ring pin 87 as described above, handle 25 is pivotally rotated, thereby displacing operating rod 19 and allowing fluid to flow through casing 9 and out discharge nozzle 5. The rotation of handle 25 is limited by the position of detent ring pin 87. If detent ring pin 87 is positioned in positioning holes 83, handle 25 will only be able to rotate a short distance before being stopped, thereby limiting the displacement of operating rod 19. Therefore, hydrant 1 will only provide a low level of flow. Alternatively, if detent ring pin 87 is positioned in positioning holes 85, handle 25 will be able to be rotated a maximum distance before being stopped, thereby allowing a large displacement of operating rod 19. In this instance, hydrant 1 will provide water at a maximum flow rate.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A hydrant comprising:
   a valve housing defining a longitudinally extending conduit having an upstream end and a downstream end;
   a nozzle in fluid communication with the upstream end;
   an operating rod disposed in the conduit for longitudinal reciprocation therein, the rod having a plunger end and a driving end, the plunger end disposed within the conduit and adapted to prevent flow of fluid through the conduit from the upstream end to the downstream end in a first position, and permit flow through the conduit in a second position, a flow rate of fluid through the conduit is dependent based upon a longitudinal position of the plunger relative to the conduit;
   a handle pivotally coupled to the valve housing and coupled to the driving end of the operating rod, whereby pivotal movement of the handle relative to the valve body causes the operating rod to move in the longitudinal direction relative to the conduit; and
   an adjustable stop coacting with the handle and operatively coupled to the handle, thereby limiting the pivotal rotation of the handle and, in turn, limit the longitudinal movement of the operating rod, thereby limiting the second position of the operating rod,
   wherein the adjustable stop is a linkage coupling the handle to the operating rod.

2. The hydrant of claim 1, wherein the valve housing includes a head portion with a pair of horizontally spaced ears, the horizontally spaced ears including holes adapted to receive the adjustable stop and the handle therebetween.

3. The hydrant of claim 2, wherein the adjustable stop includes a first slot link and a second slot link, each slot link comprising a first end, a middle portion and a second end, the first end operatively coupled to the operating rod, the middle portion including a hole adapted to register with the holes of the ears of the head section, and the second end including an elongated slot for receiving an adjustment arrangement therethrough.

4. The hydrant of claim 3, wherein the adjustment arrangement comprises a spacer positioned between the elongated slot of the first slot link and the elongated slot of the second slot link.

5. The hydrant of claim 4, wherein the adjustment arrangement further comprises a bolt and a nut securing the spacer to the first slot link and the second slot link.

6. The hydrant of claim 5, wherein the nut is a wing nut.

7. The hydrant of claim 2, wherein the flow control linkage includes a first slot link and a second slot link, each slot link comprising a first end, a middle end and a second end, the first end adapted to interact with the operating rod, the middle portion including a hole adapted to register with the holes of the ears of the head section, and the second end including a plurality of holes for receiving an adjustment arrangement therethrough.

8. The hydrant of claim 7, wherein the adjustment arrangement is a detent ring pin.

9. The hydrant of claim 8, wherein each of the plurality of holes indicates a specific position of the operating rod within the conduit.

10. A method of operating a hydrant comprising a valve housing defining a longitudinally extending conduit having an upstream end and a downstream end; a nozzle in fluid communication with the upstream end; an operating rod disposed in the conduit for longitudinal reciprocation therein, the rod having a plunger end and a driving end, the plunger end disposed within the conduit and adapted to prevent flow of fluid through the conduit from the upstream end to the downstream end in a first position, and permit flow through the conduit in a second position, a flow rate of fluid through the conduit is dependent based upon a longitudinal position of the plunger relative to the conduit; a handle pivotally coupled to the valve housing and coupled to the driving end of the operating rod; and an adjustable stop coacting with the handle and operatively coupled to the handle, the adjustable stop being a linkage coupling the handle to the operating rod, the method comprising:

adjusting the adjustable stop to a desired position; and
pivotally rotating the handle relative to the valve body until the handle comes into contact with the adjustable stop, thereby causing the operating rod to move in a longitudinal direction relative to the conduit,
wherein the adjustable stop limits the pivotal rotation of the handle and, in turn, limits the longitudinal movement of the operating rod, thereby limiting the second position of the operating rod.

11. The method of claim 10, wherein the valve housing includes a head portion with a pair of horizontally spaced ears, the horizontally spaced ears including holes adapted to receive the linkage and the handle therebetween.

12. The method of claim 11, wherein the linkage includes a first slot link and a second slot link, each slot link comprising a first end, a middle portion and a second end, the first end operatively coupled to the operating rod, the middle portion including a hole adapted to register with the holes of the ears of the head section, and the second end including an elongated slot for receiving an adjustment arrangement therethrough.

13. The method of claim 12, wherein the adjustment arrangement includes a spacer positioned between the elongated slot of the first slot link and the elongated slot of the second slot link.

14. The method of claim 13, wherein the adjustment arrangement further comprises a bolt and a nut securing the spacer to the first slot link and the second slot link.

15. The method of claim 14, wherein adjusting the adjustable stop to a desired position comprises:

loosening the nut;
sliding the spacer to the desired position; and
tightening the nut.

16. The method of claim 11, wherein the linkage includes a first slot link and a second slot link, each slot link comprising a first end, a middle portion and a second end, the first end adapted to interact with the operating rod, the middle portion including a hole adapted to register with the holes of the ears of the head section, and the second end including a plurality of holes for receiving an adjustment arrangement therethrough.

17. The method of claim 16, wherein adjustment arrangement is a pin.

18. The method of claim 17, wherein the adjusting the adjustable stop to a desired position comprises placing the pin into one of the plurality of holes.

19. A modification kit for a hydrant comprising a valve housing defining a longitudinally extending conduit having an upstream end and a downstream end; a nozzle in fluid communication with the upstream end; an operating rod disposed in the conduit for longitudinal reciprocation therein, the rod having a plunger end and a driving end, the plunger end disposed within the conduit and adapted to prevent flow of fluid through the conduit from the upstream end to the downstream end in a first position, and permit flow through the conduit in a second position, a flow rate of fluid through the conduit is dependent based upon a longitudinal position of the plunger relative to the conduit; and a handle pivotally coupled to the valve housing and coupled to the driving end of the operating rod, whereby pivotal movement of the handle relative to the valve body causes the operating rod to move in the longitudinal direction relative to the conduit, the modification kit comprising:

a first slot link and a second slot link, each slot link comprising a first end, a middle portion and a second end, the first end adapted to be operatively coupled to the operating rod, the middle portion including a hole adapted to register with holes of ears of a head section of the valve housing, and the second end including at least one opening; and
an adjustment arrangement adapted to be positioned through the at least one opening in the second end of the first slot link and the second slot link.

20. The modification kit of claim 19, wherein the at least one opening is an elongated slot.

21. The modification kit of claim 20, wherein the adjustment arrangement includes a spacer positioned between the elongated slot of the first slot link and the elongated slot of the second slot link.

22. The modification kit of claim 21, wherein the adjustment arrangement further comprises a bolt and a nut adapted to secure the spacer to the first slot link and the second slot link.

23. The modification kit of claim 19, wherein the at least one opening is a plurality of holes.

24. The modification kit of claim 23, wherein the adjustment arrangement is a pin.

25. The modification kit of claim 24, wherein each of the plurality of holes indicates a specific position of the operating rod within the conduit.

* * * * *